Oct. 4, 1949.  T. BROWN ET AL  2,483,619
ADJUSTABLE MOUNTING FOR STEERABLE WHEELS
Filed March 7, 1946  3 Sheets-Sheet 1

Oct. 4, 1949.  T. BROWN ET AL  2,483,619
ADJUSTABLE MOUNTING FOR STEERABLE WHEELS
Filed March 7, 1946  3 Sheets-Sheet 3
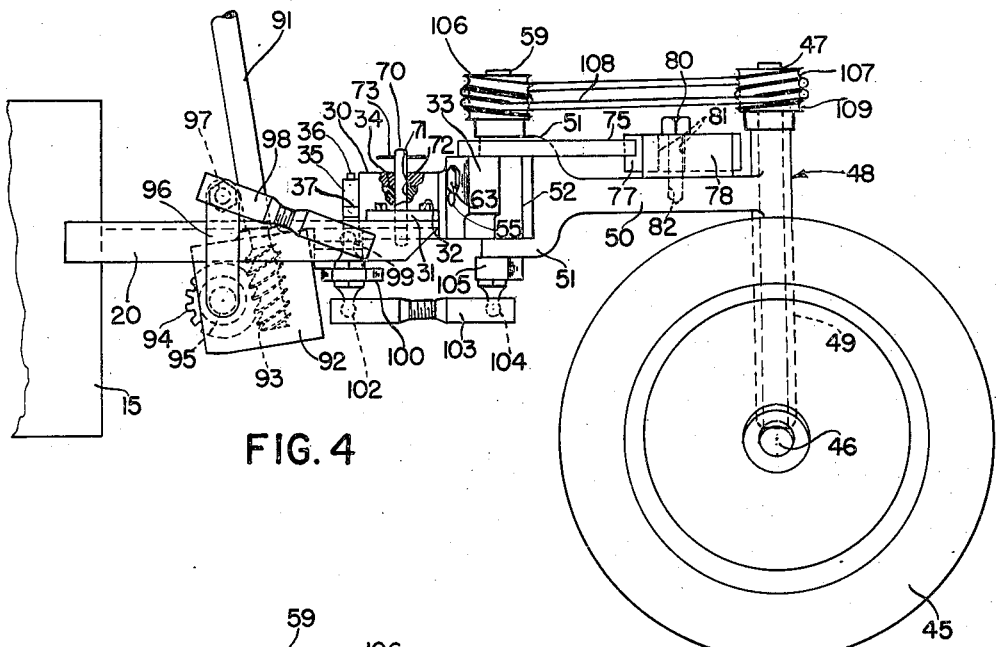
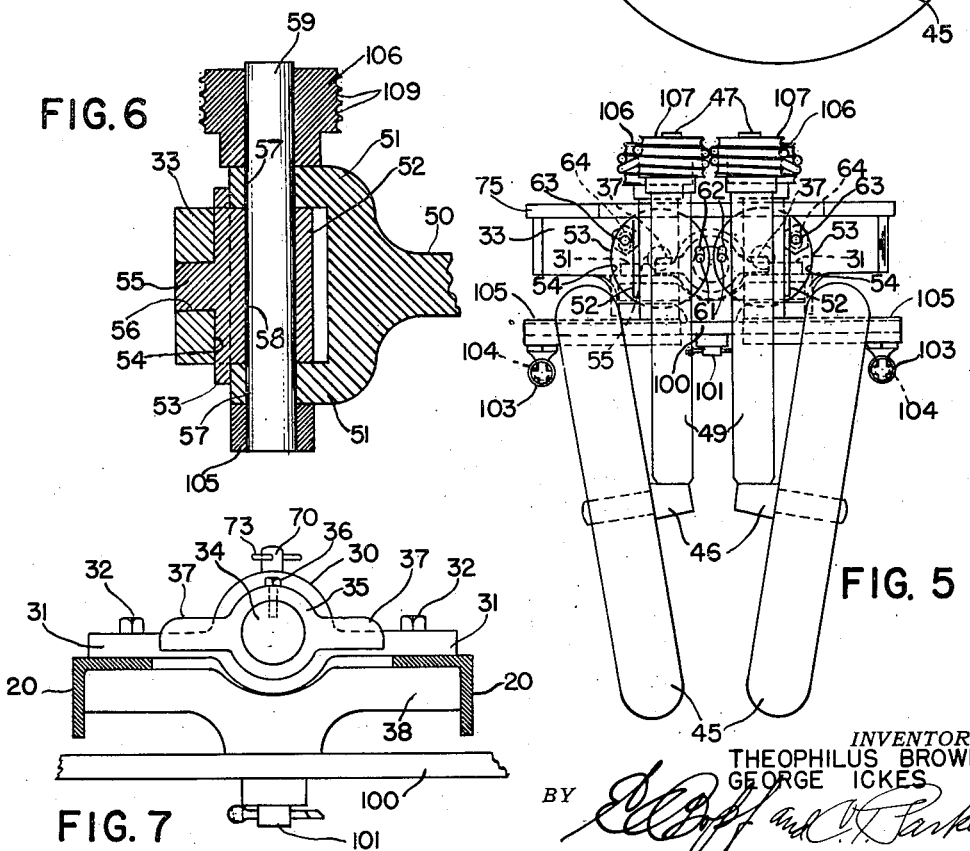
INVENTORS
THEOPHILUS BROWN
GEORGE ICKES
BY
ATTORNEYS Patented Oct. 4, 1949

2,483,619

UNITED STATES PATENT OFFICE 2,483,619

ADJUSTABLE MOUNTING FOR STEERABLE WHEELS

Theophilus Brown and George Ickes, Moline, Ill., assignors to Deere & Company, Moline, Ill., a corporation of Illinois Application March 7, 1946, Serial No. 652,697

11 Claims. (Cl. 280—96.1)

The present invention relates generally to vehicle wheel mountings and more particularly to wheel mountings of the type which provide for adjusting the lateral spacing between a pair of wheels at one end of a vehicle, and has for its principal object a novel and improved laterally adjustable wheel mounting, that is more compact, stronger and more durable in operation, and simpler in construction.

More specifically, an object of the present invention relates to the provision of a pair of swingably connected wheel mountings, which provide for shifting each of the wheels laterally relative to the frame to increase or decrease the spacing between the wheels. A related object has to do with providing for swinging the wheels at one end of a tractor or similar vehicle, from a central position in which the two wheels at one end of the tractor operate in closely spaced relation to each other, to widely spaced arrangement in which the two wheels at one end of the tractor are disposed substantially in fore and aft alignment with the other pair of wheels at the other end of the tractor, respectively.

A still further object has to do with the provision of dirigible means for controlling the laterally adjustable wheels. A related object has to do with the provision of steering control mechanism which operates equally well in all positions of lateral adjustment of the dirigible wheels. Even more specifically, it is an object of our invention to provide a pair of wheel mounting arms swingable about substantially vertical axes to adjust the lateral spacing between the wheels, with steering connections which are adapted to maintain the wheels parallel and in their proper planes of revolution, regardless of the position of lateral adjustment of the wheel mounting arms, thereby eliminating the necessity for any readjustment of the steering control mechanism after the spacing between the wheels has been changed.

Another object relates to the provision of a wheel mounting for a tractor or similar vehicle, which provides for converting the tractor from a four wheeled tractor to a tricycle type of tractor in which the front dirigible wheels run closely together between two rows of crops and the rear traction wheels run along the outside of the two rows of crops. A related object has to do with the provision for lateral tilting movement of the dirigible wheel mountings to equalize the weight of the forward end of the tractor upon the two wheels when traveling over uneven ground. In the accomplishment of this object, we have mounted the two laterally swingable wheel mounting members on a yoke member that is rockably supported on the frame for rocking movement about a fore and aft extending axis. A further object has to do with the provision of limiting the amount of lateral rocking movement in the interests of safety.

A further related object has to do with the provision for locking the wheel mountings relative to the frame to prevent lateral rocking movement when desired, such as when the wheels are arranged in closely spaced position. Obviously, when the tractor is operating as a tricycle type tractor, it is unsafe to permit any appreciable amount of lateral rocking movement of the dirigible wheel supports relative to the tractor frame, and therefore our invention contemplates a locking device that can be locked to eliminate any such lateral rocking movement when the wheels are closely spaced, but which can be disengaged to permit a lateral rocking or equalizing movement of the wheel mountings when operating as a four wheel tractor.

It is well known to those skilled in the art that it is desirable to have the dirigible wheels mounted in downwardly converging planes of rotation when the wheels are spaced closely together to bring the points of contact between the tires and the ground as close together as possible, in order to simulate a single point of support. A substantial camber must be provided in the wheels in order to provide clearance for the wheel supporting members between the two wheels. It is also desirable, however, that when the wheels operate in widely spaced relation, the wheel camber should be very substantially reduced. Therefore, it is still a further object of our invention to provide readily adjustable means for controlling the amount of camber in the dirigible wheels to provide for adjusting the camber from substantially no camber at all when the wheels are widely spaced, causing them to travel in substantially parallel planes of rotation, and adjusting the wheels to provide any graduated amount of camber when the tractor is operating as a tricycle type tractor with the dirigible wheels operating in closely spaced relation.

Another object relates to the provision of flexible steering mechanism which compensates for all of the above mentioned swinging and rocking movement of the wheel supports and for the independent adjustment of the camber of each of the wheels by shifting the wheel mounts angularly about a pair of fore and aft extending axes. Furthermore, it is an object of our invention to provide a steering control mechanism which does not require readjustment each time that the wheels are adjusted to change either the lateral spacing therebetween or the cambers thereof.

These and other objects and advantages of our invention will be apparent to those skilled in the art after a consideration of the following description, in which reference is had to the drawings appended hereto, in which Figure 1 is a top plan view of a tractor embodying the principles of our invention, the wheels being shown in widely spaced relation, with no camber;

Figure 4 is a side elevational view of the front end of the tractor, with the wheels in the position indicated in Figure 3;

Figure 5 is a front elevational view of the tractor with the wheels arranged in the closely spaced position shown in Figures 3 and 4;

Figure 6 is a sectional elevational view taken along a line 6—6 in Figure 3, showing the details of one of the pivot mountings of the wheel support and drawn to an enlarged scale; and Figure 7 is a transverse sectional elevational view taken along a line 7—7 in Figure 3 and drawn to an enlarged scale.

Figure 1:
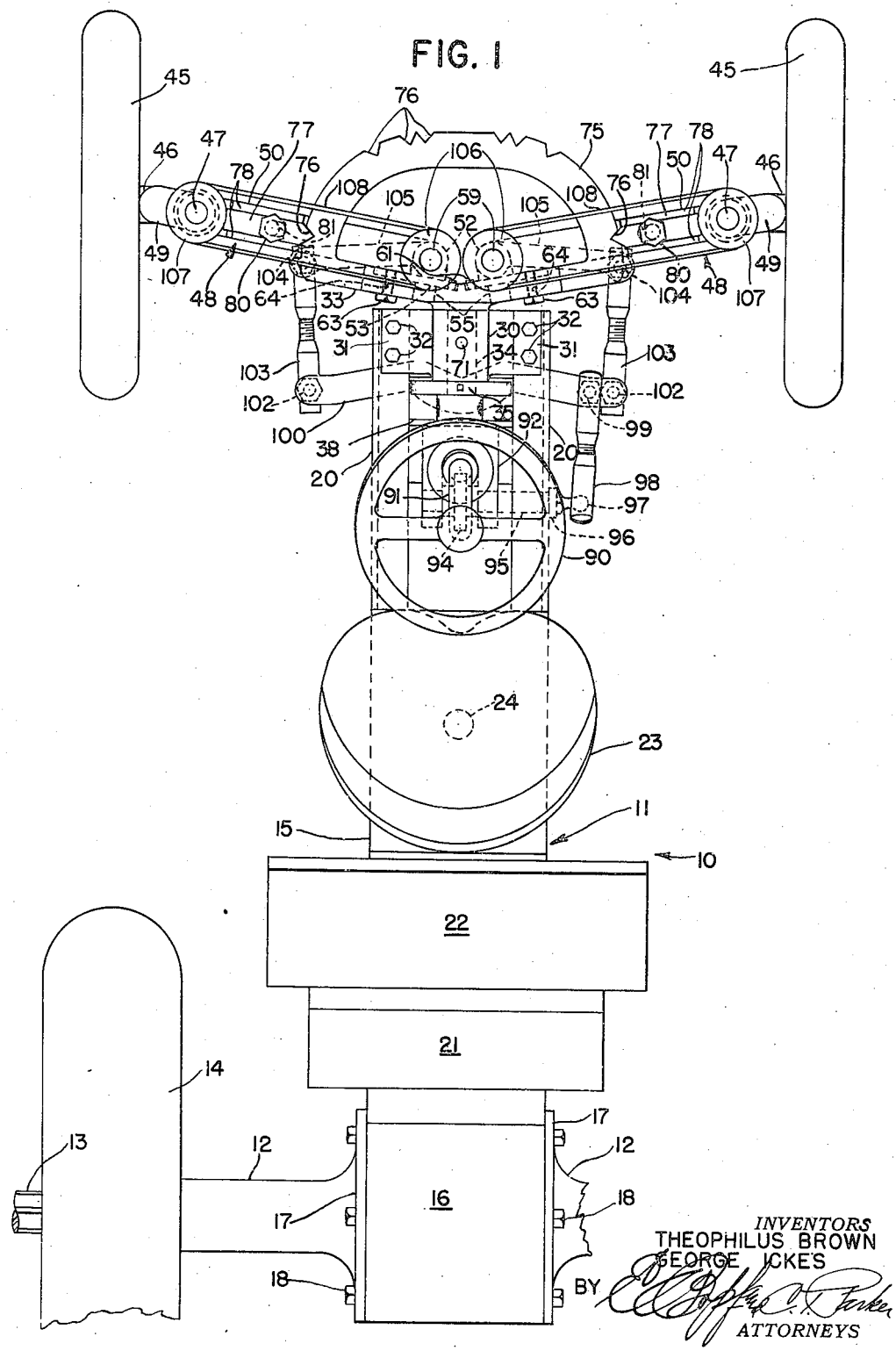

Referring now to the drawings, the tractor is indicated in its entirety by reference numeral 10 and comprises a longitudinally extending body 11 having a pair of laterally extending rear axle housings 12, within which are rotatably supported a pair of splined drive axles 13, on which are mounted a pair of rear traction wheels 14, respectively, the latter being laterally adjustable along the splined axle 13, as is well known to those skilled in the art. The body 11 comprises a longitudinally extending internal combustion engine, indicated at 15, and rigidly secured to a transmission and differential housing 16. The rear axle housings 12 are provided with radially extending supporting flanges 17, secured by bolts 18 to the sides of the housing 16, respectively. A structural frame extends forwardly from the engine 15 and comprises a pair of longitudinally extending laterally spaced, parallel structural angle members 20. A radiator 21 is mounted transversely on top of the transmission and differential housing 16, for cooling the cooling water of the engine 15, and a fuel tank 22 is mounted on the upper portion of the radiator 21, directly in front of the latter. An operator's seat 23 is mounted on a seat post 24 on top of the engine 15.

Inasmuch as the details of construction of the rear portion of the tractor are not an essential part of the present invention, it is not considered necessary to describe them in any more detail, although it might be mentioned that we have in mind a tractor substantially of the type disclosed and claimed in Patent 2,378,615, granted June 19, 1945 to Brown.

Coming now to that portion of the structure with which our invention is more directly concerned, the forward ends of the structural frame members 20 are rigidly interconnected by a bearing member 30 in the form of a cylindrical casting having a pair of laterally extending bolting flanges 31 secured by bolts 32 to the frame members 20, respectively. A transversely extending yoke member 33 extends across in front of the frame members 20 and is mounted on a stub shaft 34 rigidly fixed to the center of the yoke 33 and extending rearwardly therefrom, the shaft 34 being journaled in the cylindrical bearing member 30. Thus, the transverse yoke 33 is rockable about the fore and aft extending, centrally disposed axis of the shaft 34. The rear end of the shaft 34 extends rearwardly beyond the bearing 30 and carries a collar or hub 35, rigidly fixed thereto by a set screw 36, and provided with a pair of laterally extending stop arms 37, best shown in Figure 7. A transverse bracing member 38 is disposed beneath the collar 35 and extends transversely between the two frame members 20 and is rigidly fixed to the latter by any suitable means. Thus, the yoke 33 and shaft 34 are rockable about the fore and aft extending axis of the latter, and the collar 35 is also rockable therewith to move either of the oppositely extending stop arms 37 into engagement with the top of the transverse brace 38, thereby limiting the amount of rocking movement.

Figure 2:
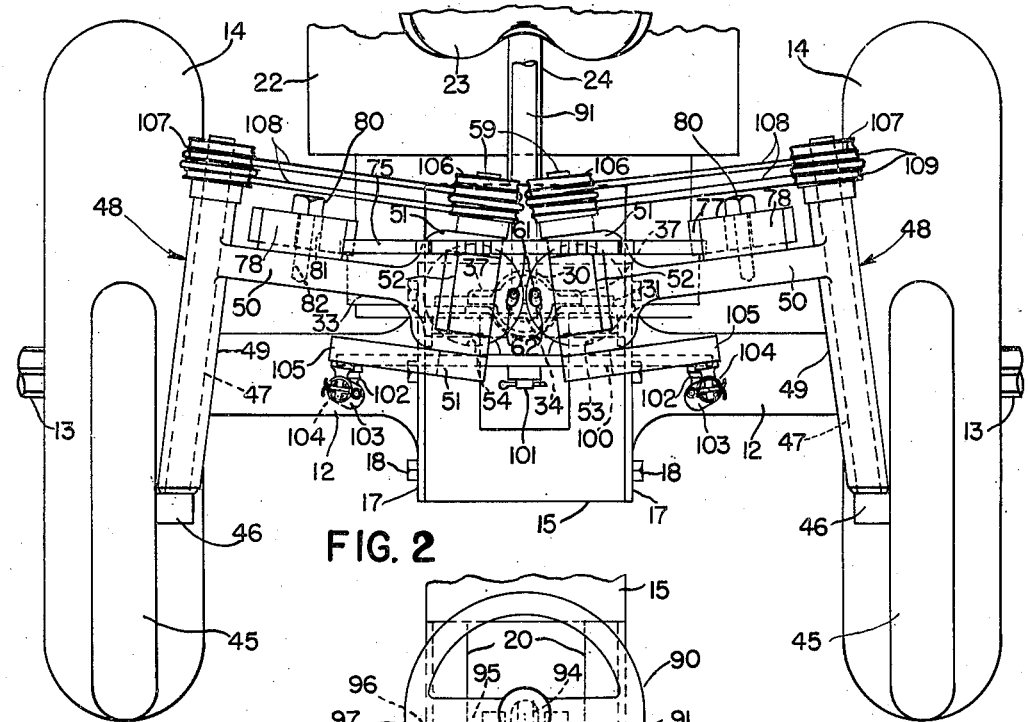
Figure 2 is a front elevational view of the tractor with the wheels disposed in the position shown in Figure 1.

A pair of supporting wheels 45 are mounted on the rockable yoke 33, by means which will be described, for supporting the forward end of the tractor. Inasmuch as the mounting means for the two wheels 45 are similar, a detailed description of one will suffice for both, like parts being indicated by like reference numerals throughout. Each of the wheels 45 is journaled on a short axle 46, which is rigidly fixed to the lower end of a spindle 47, which extends upwardly therefrom in a generally vertical position. More specifically, however, the spindle 47 is not perpendicular to the stub axle 46, but rather at a slightly obtuse angle relative thereto. As indicated in Figure 2, when the stub axle 46 is substantially horizontal, the spindle 47 inclines inwardly therefrom at a small angle of eight degrees from the vertical. Conversely when the spindle 47 is vertical, as in Figure 5, the camber of the wheel 45 is approximately eight degrees from the vertical. The spindle 47 is mounted on a wheel support, indicated generally by reference numeral 48, which comprises a generally vertical sleeve portion 49, in which the spindle 47 is turnably mounted, and an arm portion 50, extending generally horizontally from the sleeve 47 and substantially perpendicular thereto. The inner end of the arm portion 50 is bifurcated to provide a pair of upper and lower legs 51, adapted to straddle a mounting element 52, as best shown in Figures 4 and 6. The mounting element 52 is provided with a circular bearing portion 53 which is set into a circular recess 54 in the front side of the yoke 33, best shown in Figures 5 and 6. The mounting element is also provided with a trunnion 55 formed integrally therewith and journaled in a cylindrical bearing opening 56 in the yoke 33. By the above described construction, each of the mounting elements 52 is angularly shiftable about the generally fore and aft extending axis of the trunnion 55 and circular bearing plate 53. Each of the leg portions 51 of the arm 50 is provided with an aperture 57 and the mounting element 52 is provided with a vertically extending bearing opening 58 adapted to register with the apertures 57 at opposite ends thereof, respectively. A pivot pin 59 extends through the aligned apertures 57 and bearing opening 58 to swingably connect the wheel support 48 with the mounting element 52.

Figure 3:
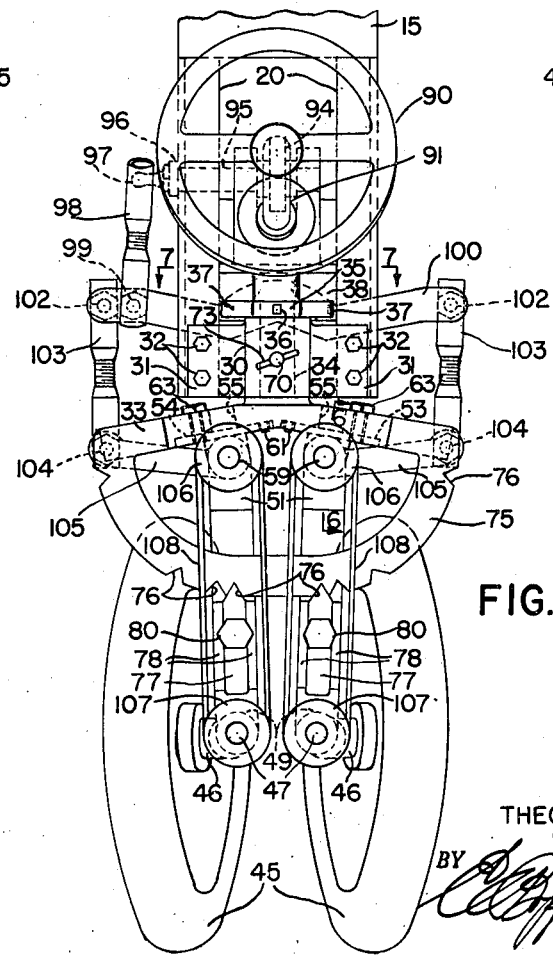
Figure 3 is a fragmentary top plan view of the forward end of the tractor, showing the dirigible wheels in closely spaced relation, with an appreciable amount of camber.

Thus, it will be evident that by virtue of the pivot connection 59 at the inner end of each of the arm portions 50 of the wheel supports 48, the latter is swingable laterally about the axis of the pivot pin 59 from a forwardly extending position, as shown in Figure 3, to a laterally extending position, as shown in Figure 1. Furthermore, by virtue of the provision for angular shifting movement of each of the mounting elements 52 relative to the yoke 33 about a fore and aft extending axis of the trunnion 55, the wheel supports 48 are angularly shiftable relative to the yoke 33 and hence, relative to each other, to adjust the camber of each of the wheels 45. It will be noted that with the spindle supporting sleeves 49 disposed close together and parallel, as shown in Figure 5, the wheels are disposed at a camber of eight degrees from the vertical axes of the spindles 47, respectively, by virtue of the obtuse angle between each of the wheel axles 46 and its associated spindle 47. Thus, the angle included between the planes of rotation of the wheels 45 is sixteen degrees, when the tractor is arranged as a tricycle type tractor. On the other hand, when the wheels 45 are widely spaced, as shown in Figures 1 and 2, when the tractor is arranged as a four wheeled vehicle, a much less camber is normally desired, preferably two degrees or less. This is obtained by angularly shifting each of the mounting elements 52 through an angle of between six and eight degrees relative to the yoke 33, to reduce the wheel camber from eight degrees to two degrees or less. Obviously, if each of the mounting elements 52 is shifted eight degrees from the position shown in Figure 5, in a direction to swing the lower ends of the spindles 47 outwardly, the wheels 45 will be thus positioned in vertical planes of revolution, as indicated in Figure 2; while the spindles 47 will thus be shifted to an inclination of eight degrees inwardly from the vertical plane of the associated wheel.

These two positions of the mounting elements 52 are determined by a pin 61 rigidly fixed to the yoke within each recess 54 and extending through a short arcuate slot 62 in the circular bearing member 53, best shown in Figures 2 and 5. Each of the slots 62 is curved about the fore and aft extending axis of the mounting element 52, and limits the angular shifting of the latter. Thus, with the wheel supports 48 adjusted for a tricycle type tractor, as illustrated in Figure 5, the pins 61 bear against the lower ends of the slots 62 and in this position, the spindles 47 are disposed in parallel vertical planes, while the wheels 45 rotate in downwardly converging planes, each with a camber of the desired value, for example eight degrees, as stated above. Then, when the wheels are shifted outwardly to their maximum lateral spacing, each of the mounting elements 52, together with its associated wheel support 48, is shifted angularly relative to the yoke about the fore and aft extending axis of the trunnion 55, to swing the wheel outwardly to its desired operating position and with its correct amount of camber, indicated in Figure 2 as zero degrees, in which position the pins 61 engage the upper ends of the arcuate slots 62 to limit the angular movement and thus to eliminate any necessity for carefully measuring and adjusting the camber of the wheels 45.

Each of the mounting elements 52 is secured in angularly adjusted position by means of a clamping bolt 63 inserted through a slot 64 in the yoke 33 and engageable with a threaded aperture in the circular bearing member 53. The slot 64 accommodates the angular shifting movement of the mounting element relative to the yoke; and when the bolt 63 is tightened securely, the circular bearing member 53 is clamped rigidly against the recess 54 in the yoke 33.

The tractor 10 can be used for plowing or for pulling any type of trailing implement, with the wheels in the widely spaced position, indicated in Figure 1. In this position, the tractor has its maximum stability, and it will be noted by comparing Figures 2 and 5, that when the wheels are in the arrangement shown in Figure 2 the frame of the tractor is appreciably lower than when the wheels are in forwardly extending closely spaced position as in Figure 5. This has the effect of lowering the center of gravity when the maximum stability is required. With this arrangement, the tractor is well adapted for plowing and for moderately high speed operation for drawing wagons and trailers along the highway. By virtue of the rockable mounting of the yoke 33 and its rockable bearing 34, the weight of the tractor is well distributed on its four wheels, regardless of the uneven contour of the ground.

On the other hand, when the tractor is arranged as indicated in Figures 3 and 4, with the wheels spaced closely together, it is undesirable to have the yoke 33 rockable laterally relative to the frame 11, for the wheels are close enough together so that they operate substantially as a single wheel and do not require the same amount of equalization that they do when operating in widely spaced relation. With the wheels in this position, however, the stability of the tractor is appreciably impaired by the rockable mounting of the yoke 33, and therefore we have provided a locking pin 70, which is insertable through a pair of apertures 71, 72 in the bearing 30 and the yoke supporting shaft 34, respectively, which are adapted to be aligned when the yoke 33 is in a horizontal position. The locking pin 70 is provided with a handle 73, which facilitates its removal from the apertures 71, 72. Hence, it will be understood that when the tractor wheels are arranged in widely spaced position, as shown in Figure 1, the pin 70 should be removed from the openings 71, 72 to permit the lateral rocking movement of the yoke, but should be inserted to lock the yoke against rocking when the wheels are in the closely spaced position, shown in Figures 4 and 5.

The wheels are swung forwardly into the closely spaced position for row crop work, where it is desired to have the two front wheels run between two adjacent rows of plants, and the two traction wheels 14 at the rear of the tractor run outside of the two rows. The rear wheels 14 can be shifted by conventional means along the axles 13, to provide the proper spacing therebetween. A suitable two row cultivator can be mounted on the tractor when the wheels are in the closely spaced position and it is well known to those skilled in the art that a comparatively long wheel base between the front and rear wheels is desirable for obtaining the necessary space for the cultivating tools, and also, a greater clearance above the ground is advantageous to provide sufficient clearance for raising the cultivators into transport position. Thus, it will be evident to those skilled in the art that a tractor embodying the principles of the present invention not only provides the necessary increased wheel base when converting from plowing to row crop arrangement, but also provides a greater clearance above the ground under the frame for row crop work, by virtue of the fact that the frame or body 11 is raised in order to provide the increased camber of the wheels as a tricycle type tractor.

The wheels are secured in laterally adjusted position by means of a U-shaped locking bar 75, rigidly secured to the top of the transverse yoke member 33 on opposite ends thereof, respectively, and curving forwardly therefrom in front of the pivot pins 59. The U-shaped locking bar 75 is provided with a plurality of notches 76 in its outer edge, which are engageable with shiftable locking members 77 which are shiftable along the tops of the two arm portions 50, respectively, between a pair of guide walls 78. The arm portions 50 of the wheel supports 48 swing beneath the locking bar 75, and a sufficient number of laterally spaced notches 76 is provided so that the wheels 45 can be locked to the bar 75 by means of the shiftable locking members 77 in any desired position of the wheels. Each of the locking members 77 is secured to the arm portion 50 against shiftable movement longtiudinally thereof, by means of a clamping bolt 80 extending downwardly through a slot 81 in the locking member 77 and extending longitudinally of the latter, into a threaded recess 82 in the top of the arm portion 50, best shown in Figure 2. Each of the wheel supports 48 is shifted independently by first loosening the clamping bolt 80, shifting the locking member 77 outwardly of the notch 76, then swinging the wheel support 48 laterally about the pivot pin 59 to the proper position, and then shifting the locking member 77 into engagement with the associated notch 76, and securing it therein by tightening the bolt 80.

Steering is accomplished by means of a conventional steering wheel 90 mounted on a steering shaft 91 in front of the operator's seat 23. The shaft 91 is mounted on a gear box 92 carried between the two structural frame members 20, and containing a worm 93 mounted on the lower end of the shaft 91 and disposed in mesh with a worm gear 94 (see Figure 4), which is mounted on a shaft 95 journaled in the gear box 92 and extending laterally outwardly therefrom. An upwardly extending arm 96 is mounted rigidly on the shaft 95 at one side of the tractor and is connected through a flexible ball and socket joint 97 to a forwardly extending extensible link 98. The forward end of the link 98 is connected by another ball and socket joint 99 to a transverse steering beam 100 disposed beneath the frame members 20 and pivotally connected by means of a vertical pivot pin 101 to the bottom of the transverse brace 38 (see Figure 7). The steering beam or bar 100 is pivotally connected at its midpoint to the center of the brace 38 and extends laterally on opposite sides of the tractor therefrom and is flexibly connected by ball and socket joints 102 to a pair of forwardly extending extensible links 103. The forward ends of the links 103 are flexibly connected by ball and socket joints 104 to the outer ends of a pair of arms 105, respectively. The arms 105 are rigidly fixed adjacent their inner ends to the two pivot pins 59, respectively, which extend below the lower legs 51 of the wheel supports 48 for this purpose.

The upper ends of the pins 59 extend upwardly beyond the upper legs 51 of the wheel supports 48, and carry cable drums 106, which are rigidly fixed thereto and rotatable therewith about the generally vertical axes of the pivot pins 59, respectively. A second pair of cable drums 107 are rigidly fixed to the upper ends of the wheel supporting spindles 47, respectively. A flexible endless cable 108 is wound around each of the spindle drums 107, the latter being provided with helical grooves 109 to receive approximately one and one-half turns of the cable 108, which extends inwardly above and substantially parallel to the arm portions 50 of the wheel supports 48, respectively. Each of the cables 108 is wound approximately one and one-half turns around the associated cable drum 106 at the inner end of its respective arm portion 50 and thus connects the spindle 47 with the associated pivot pin 59 to cause them to rotate simultaneously under control of the steering wheel 90. The cable can be fixed to each of the drums 106, 107 at one point thereon, by any suitable means, such as by welding or bolting, in order to prevent slippage of the cable on the drums. This should be done at a point on the cable that does not unwind away from the drum at any time. The drums 106, 107 and cables 108 can, if desired, be replaced by sprockets and chains, or other suitable flexible interconnecting means, although we prefer to use non-stretchable steel cables for this purpose in order to avoid loosening due to wear in the joints of the chain. The use of flexible endless members such as chains or cables, however, provides an automatic means for holding the wheels 45 in longitudinally extending planes of revolution at all times and in all straight-ahead positions of the wheels, thus eliminating any necessity for adjusting the steering mechanism when converting the tractor from a four wheeled vehicle to a tricycle type vehicle or vice versa.

It will be noted that the transverse steering bar 100 and flexible link connections therefrom to the arms 105, provide for lateral rocking movement of the yoke 33 and wheel supports 48 as a unit about the axis of the bearing support 34. This type of steering linkage also provides for angular shifting movement of the mounting elements 52 relative to the yoke 33 without affecting the steering mechanism or without requiring any adjustment thereof when a wheel adjustment is made.

It will be noted that the arms 105 on the pivot pins 59 are inclined slightly rearwardly from the axes of the latter to normally position the joints 104 on a transverse line which is spaced behind a transverse line intersecting the axes of the pins 59, with the result that when a sharp turn is made in either direction, the dirigible wheel 45 on the inside of the turn will be turned at a slightly greater angle than the outside wheel, so that the inside wheel turns on a shorter radius than that of the outside wheel, whereby each wheel runs in a true circle about the point around which the tractor is turning.

We claim:

1. In a vehicle having a frame and a pair of supporting wheels therefor, means mounting said wheels on said frame providing for lateral adjustment relative thereto comprising in combination, a pair of wheel supports, a pair of generally vertical spindles turnably mounted on said supports and having axles on which said wheels are journaled, respectively, and means connecting said supports to said frame including joint means providing for swinging said supports between transversely and longitudinally disposed positions to adjust the lateral spacing of said wheels, said connecting means also including joint means providing for angular shifting movement of said supports about fore and aft extending axes to adjust the camber of said wheels.

2. In a vehicle having a frame and a pair of supporting wheels therefor, means mounting said wheels on said frame providing for lateral adjustment relative thereto comprising in combination, a pair of wheel supports, a pair of generally vertical spindles turnably mounted on said supports and having axles on which said wheels are journaled, respectively, and means connecting said supports to said frame including mounting elements, pivot means connecting said supports to said mounting elements, respectively, providing for swinging said supports between transversely and longitudinally disposed positions to adjust the lateral spacing of said wheels, and pivot means connecting said elements to said frame, providing for angular shifting movement of said elements and said supports about fore and aft extending axes to adjust the camber of said wheels.

3. In a vehicle having a frame and a pair of supporting wheels therefor, means mounting said wheels on said frame providing for lateral adjustment relative thereto comprising in combination, a pair of wheel supports, each of said supports including a substantially vertical sleeve portion and an arm portion extending generally horizontally therefrom, a pair of spindles turnably mounted in said sleeve portions and having axles attached thereto on which said wheels are journaled, respectively, a pair of mounting elements, pivot means connecting said arm portions to said mounting elements, respectively, providing for swinging said supports between transversely and longitudinally disposed positions to adjust the lateral spacing of said wheels, and pivot means connecting said elements to said frame, providing for angular shifting movement of said elements and said supports about fore and aft extending axes to adjust the camber of said wheels.

4. In a vehicle having a frame and a pair of supporting wheels therefor, means mounting said wheels on said frame providing for lateral adjustment relative thereto comprising in combination, a pair of wheel supports, each of said supports including a substantially vertical sleeve portion and an arm portion extending generally horizontally therefrom, a pair of spindles turnably mounted in said sleeve portions and having axles attached thereto on which said wheels are journaled, respectively, a pair of mounting elements, pivot means connecting said arm portions to said mounting elements, respectively, providing for swinging said supports between transversely and longitudinally disposed positions to adjust the lateral spacing of said wheels, a yoke member, pivot means connecting said elements to said yoke member providing for angular shifting movement of said elements and said supports about fore and aft extending axes to adjust the camber of said wheels, and pivot means mounting said yoke member on said frame providing for lateral tilting movement of said yoke member, supports, and wheels relative to said frame.

5. The combination set forth in claim 4, including the further provision of disengageable locking means for locking said yoke member to said frame against said lateral tilting movement.

6. In a vehicle having a frame and a pair of supporting wheels therefor, means mounting said wheels on said frame providing for lateral adjustment relative thereto comprising in combination, a pair of wheel supports, each of said supports including a substantially vertical sleeve portion and an arm portion extending generally horizontally therefrom, a pair of spindles turnably mounted in said sleeve portions and having axles attached thereto on which said wheels are journaled, respectively, dirigible means fixed to said spindles, respectively, a pair of mounting elements mounted on said frame by means providing for angular shifting movement of said elements about generally fore and aft extending axes, a pair of pivot members disposed parallel with said spindles for swingably mounting said arm portions on said mounting elements, providing for swinging said supports laterally to adjust the spacing of said wheels, said elements being angularly shiftable relative to said frame to adjust the camber of said wheels, means for locking said mounting elements relative to each other in adjusted position, flexible endless power transmitting means trained around said pivot members and around the dirigible means on the associated wheel supports, respectively, and control mechanism for rotating said pivot members simultaneously to steer said supporting wheels and to hold said pivot members against rotation during lateral adjustment of said supporting wheels, whereby the latter are held in fore and aft extending planes of revolution during lateral adjustment of said supports.

7. The combination set forth in claim 6, including the further provision that said control mechanism includes arms fixed to said pivot members, respectively, and extending generally horizontally therefrom, a pair of generally horizontally disposed power transmitting links, a steering device, and universal joints connecting each of said links with one of said arms and with said steering device, whereby said links transmit power from said steering device to said pivot members in any position of angular adjustment of said mounting elements relative to said frame.

8. In a vehicle having a frame and a pair of supporting wheels therefor, means mounting said wheels on said frame providing for lateral adjustment relative thereto comprising in combination, a pair of wheel supports, each of said supports including a substantially vertical sleeve portion and an arm portion extending generally horizontally therefrom, a pair of spindles turnably mounted in said sleeve portions and having axles attached thereto on which said wheels are journaled, respectively, dirigible means fixed to said spindles, respectively, a yoke mounted on said frame by means providing for lateral rocking movement relative thereto about a fore and aft extending axis, a pair of mounting elements mounted on said yoke, a pair of mounting elements mounted on said frame by means providing for angular shifting movement of said elements about generally fore and aft extending axes, a pair of pivot members disposed parallel with said spindles for swingably mounting said arm portions on said mounting elements, providing for swinging said supports laterally to adjust the spacing of said wheels, said elements being angularly shiftable relative to said yoke to adjust the camber of said wheels, means for locking said mounting elements relative to said yoke in adjusted position, a flexible endless member trained around each of said pivot members and around the dirigible means on the associated wheel support, and control mechanism for rotating said pivot members simultaneously to steer said supporting wheels.

9. The combination set forth in claim 8, including the further provision that said control mechanism includes arms fixed to said pivot members, respectively, and extending laterally therefrom in relatively opposite directions, a pair of longitudinally extending power transmitting links, universal joint means connecting said links to the last mentioned arms, a transversely disposed steering beam pivotally mounted at its central portion on said frame, and universal joint means connecting said links with opposite ends of said beam, respectively, said universally connected links providing for angular adjustment of said mounting elements and for rocking movement of said yoke without transmitting movement to said steering beam.

10. In a vehicle having a generally longitudinally extending frame and a pair of supporting wheels therefor, means rotatably and shiftably mounting the wheels on the frame, comprising joint means providing for shifting the wheels selectively toward or away from each other to vary the lateral spacing therebetween; and joint means including parts arranged for adjustable angularity and providing for shifting the wheels with respect to a longitudinal vertical plane to vary the camber thereof.

11. In a tractor having a frame and a pair of laterally spaced drive wheels at one end thereof, a dirigible wheel mounting at the other end of said frame comprising, in combination, a transversely disposed member, a pair of wheels, a pair of spindles having axles on which said wheels are journaled, respectively, a pair of supports in which said spindles are dirigibly mounted, supporting arms extending laterally from said spindle supports, means swingably connecting said arms to said member providing for shifting movement of said arms between a generally transverse position and a generally fore and aft extending position relative to said frame, to adjust the lateral spacing between said ground engaging dirigible wheels, means detachably fixing said arms to said member in adjusted position including a U-shaped element extending from said member in the direction of swinging movement of said arms, and means for locking each of said arms to said element in any of several positions of adjustment.

THEOPHILUS BROWN.
GEORGE ICKES.

REFERENCES CITED

The following references are of record in the file of this patent:

UNITED STATES PATENTS

| Number | Name | Date |
| --- | --- | --- |
| 795,100 | Burtless et al. | July 18, 1905 |
| 1,396,128 | Kopplin | Nov. 8, 1921 |
| 1,616,295 | Yourtee | Feb. 1, 1927 |
| 2,048,788 | Falknor | July 28, 1936 |
| 2,209,804 | Ashley | July 30, 1940 |
| 2,294,945 | Zink | Sept. 8, 1942 |
| 2,378,615 | Brown | June 19, 1945 |